United States Patent [19]

Zahradnik

[11] 4,261,225
[45] Apr. 14, 1981

[54] STEP-DOWN TRANSMISSION FOR DRIVING A PLURALITY OF EXTRUSION SCREWS

[75] Inventor: Rudolf Zahradnik, Vienna, Austria

[73] Assignee: Maplan Maschinen- und technische Anlagen, Planungs- und Fertigungs-Gesellschaft mbH, Vienna, Austria

[21] Appl. No.: 12,745

[22] Filed: Feb. 16, 1979

[51] Int. Cl.³ .......................... F16H 37/06; F16H 1/02
[52] U.S. Cl. ............................. 74/665 GA; 74/412 R; 74/413
[58] Field of Search ......... 74/665 GA, 665 G, 665 F, 74/665 GD, 412 R, 413, 421 R; 72/262; 425/204

[56] References Cited

U.S. PATENT DOCUMENTS 3,824,875  7/1974  Willert et al. ................. 74/665 GA
3,922,997  12/1975  Jameson .
3,969,956  7/1976  Hanslik ........................... 74/665 GD

FOREIGN PATENT DOCUMENTS 1288202  2/1962  France ............................... 72/262

Primary Examiner—C. J. Husar
Assistant Examiner—Frank McKenzie
Attorney, Agent, or Firm—Montague & Ross

[57] ABSTRACT

A step-down transmission for driving a plurality of extrusion screws from a common power source comprises a main shaft, directly connected with one screw and coupled with the source via a reduction gearing, and one or more pairs of corotating ancillary shafts coupled with the main shaft via gear trains each including a cylindrical gear in mesh with two spur gears respectively keyed to the shafts of the corresponding pair. The paired ancillary shafts carry helical gears in mesh with a common pinion on a shaft of another screw closely adjoining and possibly intermeshing with the first-mentioned screw.

8 Claims, 3 Drawing Figures

STEP-DOWN TRANSMISSION FOR DRIVING A PLURALITY OF EXTRUSION SCREWS

FIELD OF THE INVENTION

My present invention relates to a step-down transmission designed to drive, from a common source of motive power, a plurality of jointly rotating screws of an extruder for the plastification, mixing and/or shaping of a mass of synthetic resin.

BACKGROUND OF THE INVENTION

The use of two or more extrusion screws in a common housing, generally of steel, is advantageous for the effective mastication and conveyance of considerable quantities of thermoplastic material. With thermally unstable plastics it is generally necessary to use deep-cut screws with interleaved threads counterrotating at rather slow speeds under a large torque.

The small spacing between the axes of such coacting screws creates problems in accommodating the necessary speed-reduction gearing by which they must be connected to a common power shaft for rotation in unison. Difficulties are particularly experienced with the mounting of the transmission output shafts directly connected with the respective screws coaxial therewith. The large torques to be transmitted to the extrusion screws via intermeshing gears generate considerable pressures at the gear teeth which tend to deform the output shafts driving the screws and lead to a loss of parallelism of these shafts in their highly stressed bearings. The latter, in turn, must be restricted in size because of the limited space available for their emplacement. It is also not possible to increase at will the axial width of the gears, in order to reduce the pressure per unit area, since this would unavoidably bring about a nonuniform contact between the tooth flanks of the driving and driven gears; this problem is solved only in part, and at the cost of an increased axial length, by the use of several juxtaposed pairs of gears with oppositely inclined teeth.

OBJECT OF THE INVENTION

The object of my present invention is to provide a simple and inexpensive step-down transmission for the purpose set forth which is of compact construction and obviates the disadvantages referred to above, with minimum wear of its gear teeth and correspondingly lengthened service life.

SUMMARY OF THE INVENTION

I realize this object, in conformity with my present invention, by the provision of a main shaft carrying a primary spur gear and an output shaft carrying a pinion axially offset from that main gear, these two shafts being directly and coaxially connected with respective extrusion screws closely adjoining each other, namely a first screw and another screw coacting therewith. Two ancillary shafts paralleling the main shaft carry respective secondary spur gears of like tooth number as well as two driven gears of like tooth number, the latter being in mesh with the pinion on the output shaft driving the coacting screw whereas the secondary spur gears mesh with a satellite gear in driving engagement with the primary spur gear, the axis of this satellite gear paralleling the several shafts. Thus, the torque exerted by the power source upon the primary spur gear is split between the main shaft and the two satallite shafts, the partial torques of these latter shafts being combined in driving the coacting screw.

If the system includes more than two juxtaposed extrusion screws, each additional screw coacting with the first screw is driven in the aforedescribed manner by way of an associated pair of ancillary shafts from the primary spur gear.

With n extrusion screws, the driving torque should be divided as evenly as possible among the main shaft and the $(n-1)$ pairs of ancillary shafts. This can be achieved by designing the main and ancillary shafts as torsion bars of such diameters that the moments of torsion resistance of each pair of ancillary shafts substantially equal that of the main shaft, thus resulting in the transmission of the $n^{th}$ part of the applied torque to each extrusion screw. The ancillary shafts, accordingly, will be considerably thinner than the main shaft if made from the same metal.

Advantageously, pursuant to another feature of my invention, the axis of the output shaft for the coacting screw defines with the axes of the associated ancillary shafts a pair of planes including with each other an obtuse angle, preferably of about 120°, which is bisected by the axial plane of the main and output shafts whereby the output shaft is under radial pressure from three substantially equispaced points.

Pursuant to a further feature of my invention, the driven gears on the ancillary shafts and the pinion engaged thereby are provided with helical teeth exerting upon that output shaft an axial force in a direction away from the associated coacting screw. This axial force is absorbed by a thrust bearing supporting the output shaft at a location between the main and ancillary shafts.

BRIEF DESCRIPTION OF THE DRAWING

The above and other features of my invention will now be described in detail with reference to the accompanying drawing in which.

SPECIFIC DESCRIPTION

Figure 1:
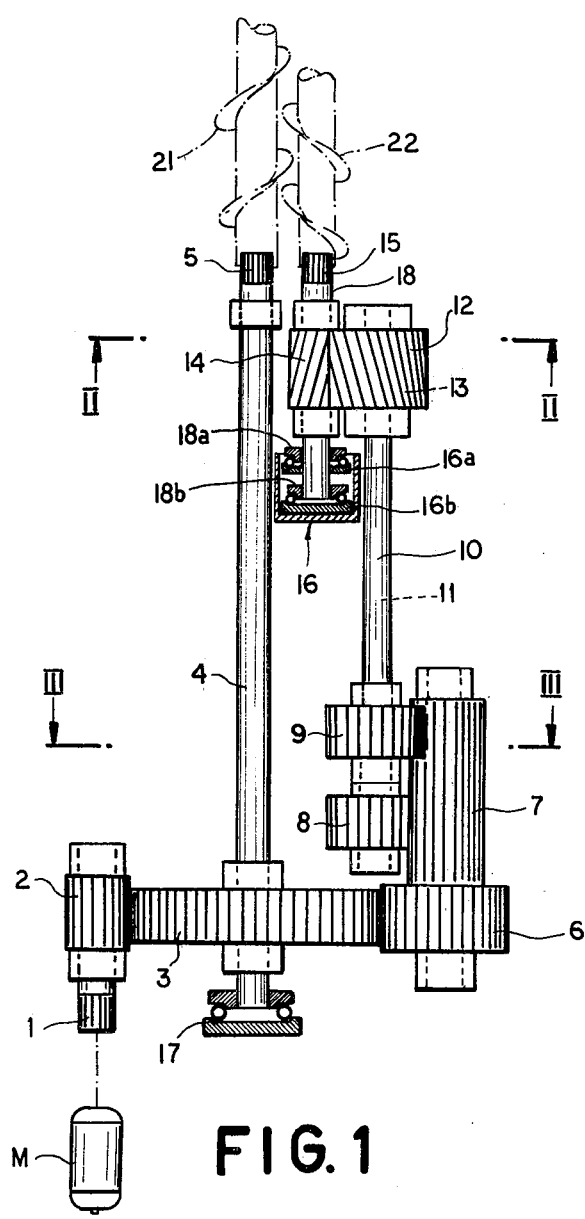
FIG. 1 is a plan view of a step-down transmission according to my invention.

In FIG. 1 I have shown a pair of intermeshing and identical screws 21, 22 which are part of a conventional, otherwise nonillustrated extrusion press including a cyclindrical housing with a nozzle for the discharge of a compacted thermoplastic mass. The two screws are counterrotated by a drive motor M via a step-down transmission including a pinion 2 on an input shaft 1 coupled with the motor and a large primary spur gear 3 in mesh with that pinion, gear 3 being keyed to a main shaft 4 whose splined extremity 5 engages the extrusion screw 21 coaxial therewith. Gear 3 is also in mesh with a larger-diameter portion 6 of a stepped satellite gear whose smaller-diameter portion 7 of elongate cylindrical shape engages two secondary spur gears 8 and 9 which are axially offset from each other and from gear 3. As best seen in FIG. 3, where (as well as in FIG. 2) the several gears have been indicated for simplicity's sake only by their pitch circles, gears 8 and 9 are keyed to respective satellite shafts 11 and 10 parallel to main shaft 4 but of substantially smaller diameter than the latter; shafts 10 and 11 carry respective driven gears 12 and 13, best seen in FIG. 2, which mesh with a pinion 14 on an output shaft 18 whose splined extremity 15 engages the extrusion screw 22 coaxial therewith. Gears 8 and 9 have the same number of teeth; this is also true of gears 12 and 13.

Figure 2:
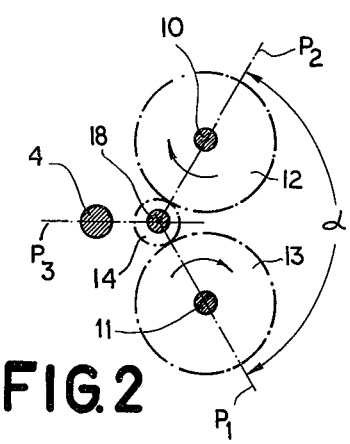
FIGS. 2 and 3 are somewhat diagrammatic cross-sectional views respectively taken on the lines II—II and III—III of FIG. 1.
Figure 3:
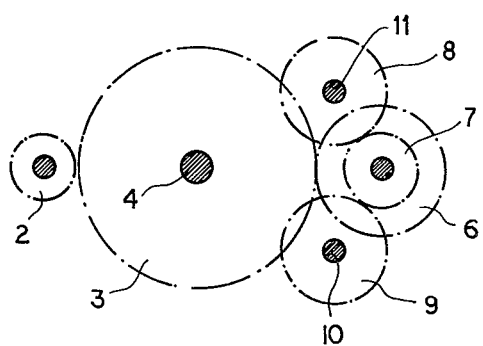

As will be apparent from FIG. 2, the axes of shafts 10, 11 and 18 define a pair of planes $P_1$, $P_2$ which include with each other an angle $\alpha$ of 120° and pass through the points of contact between the pitch circles of gears 12, 13 and 14. The angle $\alpha$ is bisected by a plane $P_3$ which includes the axes of shafts 4 and 18. The pressure built up between screws 21 and 22 acts upon the shaft 18 in this plane $P_3$, thus along a line separated by 120° from the aforementioned points of contact where the shaft is subjected to driving pressure from gears 12 and 13.

It will be noted that gears 12 and 13 as well as pinion 14 have helical teeth which, upon rotation of their shafts in the direction indicated by arrows, transmit an axial force upon shaft 18 in a direction away from screw 22. This axial force is absorbed by an assembly 16 of axially staggered thrust bearings including two fixed races 16a, 16b and two rotating races 18a, 18b on shaft 18. Assembly 16 also serves as a journal bearing for this shaft. It will be understood that the other shafts are likewise provided with journal and thrust bearings which have not been illustrated, except for a bearing 17 supporting the extremity of shaft 4 remote from screw 21.

If the extruder has only the two screws 21 and 22, the torque applied by motor M and pinion 2 to gear 3 should be evenly split between the two screws. For this purpose the main shaft 4 and the two ancillary shafts 10, 11 are so dimensioned that the former transmits half of the applied torque while each of the latter transmits a quarter thereof. Especially in the case of a two-screw system, motor M could drive the primary spur gear 3 through the intermediary of satellite gear 6, 7, possibly by way of further reduction gearing, with omission of pinion 2. In a multiple-screw extruder with screw 21 at the center of the array, the satellite gears associated with the several outlying screws would be peripherally spaced about gear 3.

Transmissions according to my invention, when constructed from the usual materials, may have a life span of the order of 25,000 hours of continuous operation.

I claim:

1. In an extruder provided with a plurality of parallel extrusion screws, including a first screw and at least one other screw coacting therewith, and a common source of motive power for jointly rotating said extrusion screws, the combination therewith of a step-down transmission inserted between said source and said extrusion screws, said transmission comprising:

reduction gearing driven by said source including a primary spur gear on a main shaft directly and coaxially connected with said first screw;

a satellite gear in driving engagement with said primary spur gear centered on an axis parallel to said main shaft;

a pair of ancillary shafts paralleling said main shaft and carrying respective secondary spur gears of like tooth number in mesh with said satellite gear;

a pinion axially offset from said primary spur gear on an output shaft, paralleling said main shaft, directly and coaxially connected with said coacting screw; and a pair of driven gears of like tooth number on said ancillary shafts in mesh with said pinion for rotating said coacting screw in unison with said first screw.

2. The combination defined in claim 1 wherein said ancillary shafts are mutually identical with a combined torsion resistance substantially equaling that of said main shaft for splitting the driving torque of said source about evenly between said screws.

3. The combination defined in claim 1 or 2 wherein the axis of said output shaft defines with the axes of said ancillary shafts a pair of planes including with each other an obtuse angle bisected by a plane defined by the axes of said main and output shafts.

4. The combination defined in claim 3 wherein said obtuse angle is of the order of 120°.

5. The combination defined in claim 1 wherein said satellite gear is divided into a large-diameter portion meshing with said primary spur gear and a small-diameter portion meshing with said secondary spur gears.

6. The combination defined in claim 1 2 or 5 wherein said driven gears and said pinion are provided with helical teeth.

7. The combination defined in claim 6, further comprising unidirectionally effective thrust-bearing means between said main and ancillary shafts supporting said output shaft, said helical teeth exerting an axial force in a direction away from said coacting screw and toward said thrust-bearing means.

8. The combination defined in claim 7 wherein said thrust-bearing means comprises a plurality of axially staggered thrust bearings.

* * * * *